(12) United States Patent
Novak et al.

(10) Patent No.: US 9,184,892 B2
(45) Date of Patent: Nov. 10, 2015

(54) DEVICE-ASSISTED INTERFERENCE MANAGEMENT IN HETEROGENEOUS WIRELESS CELLULAR SYSTEMS

(75) Inventors: Robert Novak, Stittsville (CA); Chandra Sekhar Bontu, Nepean (CA); Shalini Suresh Periyalwar, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/822,420

(22) PCT Filed: May 31, 2011

(86) PCT No.: PCT/CA2011/050328
§ 371 (c)(1),
(2), (4) Date: May 24, 2013

(87) PCT Pub. No.: WO2012/162787
PCT Pub. Date: Dec. 6, 2012

(65) Prior Publication Data
US 2014/0078976 A1    Mar. 20, 2014

(51) Int. Cl.
*H04L 5/00* (2006.01)
*H04W 24/02* (2009.01)
*H04W 72/08* (2009.01)

(52) U.S. Cl.
CPC ............. *H04L 5/0058* (2013.01); *H04W 24/02* (2013.01); *H04W 72/082* (2013.01)

(58) Field of Classification Search
CPC ... H04L 5/0053; H04L 5/0073; H04W 24/02; H04W 72/0426; H04W 72/082
See application file for complete search history.

(56) References Cited

U.S. PATENT DOCUMENTS

| 2004/0259561 | A1 | 12/2004 | Stewart et al. |
| 2007/0171819 | A1 | 7/2007 | Julian et al. |
| 2008/0025442 | A1* | 1/2008 | Hwang et al. .................. 375/346 |
| 2009/0086673 | A1 | 4/2009 | Aminaka et al. |
| 2009/0196174 | A1 | 8/2009 | Ji |
| 2010/0039948 | A1* | 2/2010 | Agrawal et al. ............... 370/252 |
| 2010/0167653 | A1* | 7/2010 | Kim et al. .................... 455/63.1 |
| 2011/0038328 | A1 | 2/2011 | Wang et al. |
| 2011/0085513 | A1 | 4/2011 | Chen et al. |

FOREIGN PATENT DOCUMENTS

| WO | 2009099811 A1 | 8/2009 |
| WO | 2011038645 A1 | 4/2011 |

OTHER PUBLICATIONS

Novak, Robert, et al.; U.S. Appl. No. 13/822,431, filed Sep. 27, 2013; Title: Access Point for Device-Assisted Interference Management in Heterogeneous Wireless Cellular Systems.
European Extended Search Report; Application No. 11866686.6; Nov. 3, 2014; 6 pages.

(Continued)

*Primary Examiner* — Yong Zhou
(74) *Attorney, Agent, or Firm* — Conley Rose, P.C.; J. Robert Brown, Jr.

(57) ABSTRACT

Devices and methods are provided for device-assisted interference management in heterogeneous wireless network environments. A mobile station (MS) assists a serving access point (AP) in assigning radio resources according to the interference management capabilities of the MS, the serving AP, and one or more neighboring interfering APs on the downlink, or alternatively, to one or more neighboring APs with interfering mobile stations on the uplink.

19 Claims, 10 Drawing Sheets

(56) References Cited

OTHER PUBLICATIONS

International Search Report and Written Opinion dated Aug. 17, 2011 for Application No. PCT/CA2011/050328.
International Search Report and Written Opinion dated Oct. 21, 2011 for Application No. PCT/CA2011/050329.
Extended European Search Report for related EP Application No. 11887089.2-1857/2716119, dated Sep. 29, 2014, pp. 1-6.
Office Action dated Mar. 12, 2015; U.S. Appl. No. 13/822,431, filed Sep. 27, 2013; 24 pages.
Notice of Allowance dated Jul. 7, 2015; U.S. Appl. No. 13/822,431, filed Sep. 27, 2013; 9 pages.

* cited by examiner

DEVICE-ASSISTED INTERFERENCE MANAGEMENT IN HETEROGENEOUS WIRELESS CELLULAR SYSTEMS

CROSS REFERENCE TO RELATED APPLICATIONS

This is a National Stage application of International Patent Application No. PCT/CA2011/050328, entitled "Device-Assisted Interference Management In Heterogeneous Wireless Cellular Systems" by inventors Robert Novak, Chandra S. Bontu, and Shalini Periyalwar, filed on May 31, 2011, the contents of which are incorporated by reference in their entirety.

International Patent Application No. PCT/CA2011/050329, entitled "Access Point for Device-Assisted Interference Management In Heterogeneous Wireless Cellular Systems" by inventors Chandra S. Bontu, Robert Novak, and Shalini Periyalwar, filed on May 31, 2011, describes exemplary methods and systems and is incorporated by reference in its entirety.

BACKGROUND

The realization of greater wireless capacity in today's communications environments may require the achievement of a consistently higher signal to interference-plus-noise ratio (SINR) over a significant percentage of a cell's coverage area. Yet achievement of such a goal will require, in general, smaller cells or alternatively, operation in a smaller region of a cell when operating at a given transmission power level. Hence, the current network model of higher-power outdoor macro cells will need to be augmented by lower-power indoor and outdoor micro- and pico-cells. While such a move towards smaller cells will significantly increase the number of access points within a cellular system, will also lead to significant coverage overlap, both planned and unplanned, between cells.

Co-ordination of transmission and reception in today's cellular systems has been designed with the philosophy of "smart network, dumb user equipment," reflecting the telephone-centric mindset of a previous era. The "smart" network model is based on the premise that the network has a global view, and overall control, of everything that is occurring within the network. However, this assumption breaks down in a heterogeneous coverage environment as it is unlikely that a single, centralized network entity will have a global view and overall control. As an example, transmission and reception within a given cell is coordinated by the Access Point (AP) responsible for that cell. However, operation across cell boundaries may be un-coordinated due to different administrative domains or to difficulties encountered when communicating between APs. As a consequence, completely un-coordinated operation may ultimately result in unacceptable levels of interference that could negate the benefits of improved signal levels garnered through the use of smaller cells.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
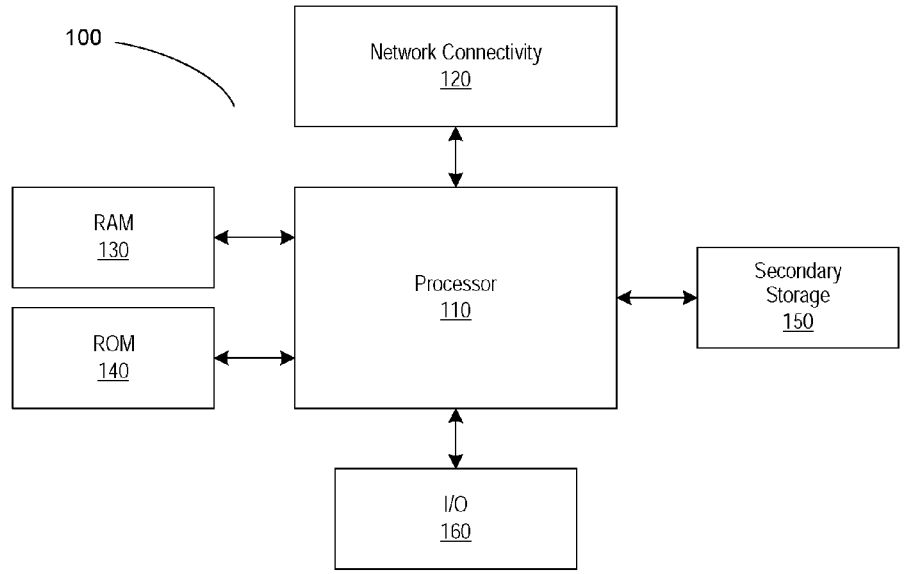
FIG. 1 depicts an exemplary system in which the present disclosure may be implemented.

The present disclosure is directed in general to communications systems and methods for operating same. In one aspect, the present disclosure relates to devices and methods for providing device-assisted interference management in heterogeneous wireless network environments.

An embodiment is directed to a mobile station (MS), comprising processing logic configured to manage interference of a transmission, the processing logic configured to be used by the MS to dynamically perform capability assessment operations to generate capability data associated with interference management capabilities of the MS, wherein the capability data is configured to be provided to a serving access point (AP) and one or more neighboring APs for an assignment of radio resources according to the interference management capabilities of the MS, the serving AP, and the one or more neighboring interfering APs.

An embodiment is directed to a method for managing interference of a transmission, comprising using processing logic of a mobile station (MS) to dynamically perform capability assessment operations to generate capability data associated with interference management capabilities of the MS, and providing the capability data to a serving access point (AP) and one or more neighboring APs for an assignment of radio resources according to the interference management capabilities of the MS, the serving AP, and the one or more neighboring interfering APs.

Devices and methods are provided for device-assisted interference management in heterogeneous wireless network environments. In various embodiments, the management of interference of a transmission is aided by a mobile station assisting the serving access point (AP) that will be assigning and or granting downlink (DL) radio resources and uplink (UL) radio resources according to the interference management capabilities of a mobile station (MS), the serving AP, and one or more neighboring interfering APs, and their associated mobile stations. In certain of these embodiments, residual inter-AP interference is minimized at the MS by accounting for the interference management capability of the MS, which is conveyed to the serving AP. Residual inter-AP interference is likewise minimized at the MS in certain of these embodiments by accounting for the capability of the serving AP and the interference causing neighboring APs to direct the transmission to the MS to mitigate the interference. Likewise, residual inter-AP interference is minimized at the MS in certain of these embodiments by accounting for the capability of the neighboring interfering APs to direct the transmission to a second MS to mitigate interference.

In one embodiment, the MS influences a DL scheduling decision by identifying interfering APs and making a recommendation of its capability to cancel one or more of the dominant interferers. In another embodiment, residual inter-AP interference is minimized by the serving AP first sending an advance radio resource assignment (ARA) to the MS. The MS then selects a subset of the radio resources from the radio resources recommended by the ARA according to the DL channel quality the MS observes the mobile stations interference rejection capabilities and provides its selection to the serving AP. In response, the serving AP provides a ARA acknowledgement (ARA ACK) to the MS according to its previous selection. The MS then communicates the ARA ACK to one or more neighboring interfering APs, appending its preferred transmission configuration of neighboring interfering APs. Thereafter, the MS configures the state of its receiver to responses received from the serving AP.

In yet another embodiment, the serving AP grants uplink (UL) radio resources according to the interference management capabilities of the MS, the serving AP, and one or more neighboring interfering APs. In this embodiment, one or more neighboring interfering APs serve a corresponding one or more neighboring interfering mobile stations. Residual UL interference at the serving AP is minimized by the MS first providing the interference management capability of the MS to the serving AP and the neighboring interfering APs. The interference mitigation capability of the serving AP is then provided, which comprises the ability to mitigate interference from the neighboring interfering mobile stations. The MS then provides the capability of the neighboring interfering APs to mitigate interference to one another if they are not communicating directly.

In still another embodiment, the serving AP grants uplink (UL) radio resources according to the interference management capabilities of the MS and neighboring interfering APs. In this embodiment, neighboring interfering APs are likewise serving a corresponding one or more neighboring interfering mobile stations. Residual UL interference at the serving AP is minimized in this embodiment by the serving AP first sending an advance radio resource grant (ARG) to the MS. A resource grant is then selected according to the ARG notification messages previously received from neighboring interfering mobile stations at the serving AP and likewise, according to the channel quality (CQ) measured at the serving AP during previous UL transmissions from the MS. The AP then identifies which neighboring interfering APs correspond to neighboring interfering mobile stations that are considered dominant interferers to the MS. The MS then communicates the ARG to the identified neighboring interfering APs, who in response send an ARG notification acknowledgement message in return to the MS. The MS then sends an ARG response to the serving AP, which then in turn sends the resource grant (RG) to the MS after assessing the available resources and the interference mitigation capabilities of the MS. In one embodiment, the MS appends its dynamically-assessed interference mitigation capabilities to the ARG response message.

In another embodiment, the APs intending to communicate with the neighboring APs establish a secure tunnel via an active MS. Once secure keys are exchanged between an AP and all of its neighboring APs, all future communication between the APs is protected. For example, for DL interference management, the ARA ACK may be sent to MS by the serving AP. Part of the information contained in the message may be addressed to neighboring APs and another part is intended for the MS. The information intended for the neighboring APs is protected by a secure key such that it is protected from unauthorized users. After receiving this message, the MS appends its capabilities and forwards the message to the neighboring APs as an ARA notification message to enable secure inter-AP communication. Likewise, for uplink interference management, the ARG message may consist of two information fields, one for the neighboring APs and the other for the MS that is requesting UL resources. The information field for the neighboring APs is likewise protected by the secure keys previously exchanged. After receiving the ARG message, the MS decodes the information field addressed to it and sends the ARG notification message to the neighboring APs by including the information field intended for the neighboring APs contained within the ARG message received from the serving AP and appending its own interference managing capabilities.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
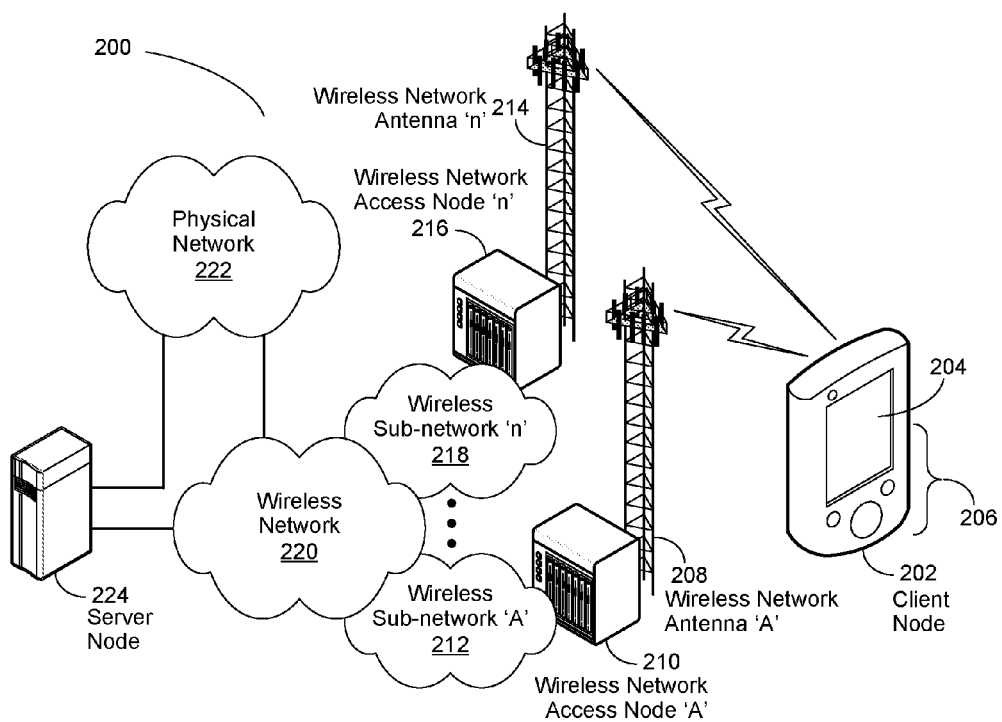
FIG. 2 shows a wireless-enabled communications environment including an embodiment of a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 212. Skilled practitioners of the art will recognize that many such embodiments are possible and the foregoing is not intended to limit the spirit, scope, or intention of the disclosure.

Figure 3:
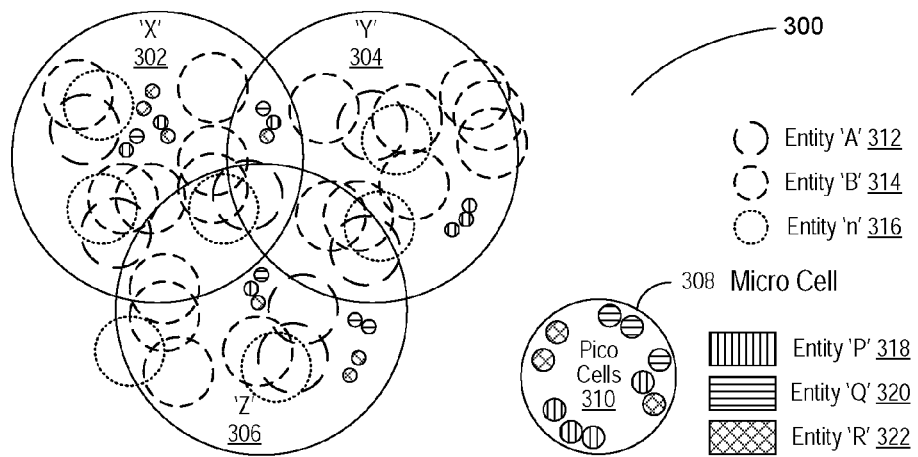
FIG. 3 is a simplified topological diagram of a heterogeneous wireless network environment comprising a plurality of macro cells, micro cells, and pico cells.

FIG. 3 is a simplified topological diagram of a heterogeneous wireless network environment comprising a plurality of macro cells, micro cells, femto cells and pico cells as implemented in accordance with an embodiment of the disclosure. In this embodiment, a heterogeneous wireless network environment comprises a plurality of wireless network macro cells 'X' 302, 'Y' 304 through 'Z' 306. In this and other embodiments, each of the wireless network macro cells 'X' 302, 'Y' 304 through 'Z' 306 may comprise a plurality of wireless network micro cells 308, which in turn may comprise a plurality of wireless network pico cells 310. Likewise, the wireless network macro cells 'X' 302, 'Y' 304 through 'Z' 306 may also comprise a plurality of individual wireless pico cells 310.

In various embodiments, the micro cells 308 may be associated with entity 'A' 312, 'B' 314 through 'n' 316, and the pico cells 310 may likewise be associated with entity 'P' 318, 'Q' 320 through 'R' 322. In these various embodiments, the wireless macro cells 'X' 302, 'Y' 304 through 'Z', micro cells 308, and pico cells 310 may comprise a plurality of wireless technologies and protocols, thereby creating a heterogeneous operating environment within the wireless network system 300. Likewise, each of the wireless macro cells 'X' 302, 'Y' 304 through 'Z' 306, micro cells 308, and pico cells 310 comprises a corresponding access point (AP). As used herein, an AP is a generic term that broadly encompasses wireless LAN access points, macro cellular base stations (e.g., NodeB, eNB), micro- and pico-cells, relay nodes and home-based femtocells (e.g., HeNB), or any telecommunications technology operable to establish and sustain a wireless communication session. As likewise used herein, a "cell" (or "sector") is a portion of the coverage area served by an AP. According, each cell has a set of radio resources that can be associated with that cell through, for example, a unique cell identifier.

Skilled practitioners of the art are aware that future wireless network systems will likely rely on denser deployments of heterogeneous network technologies such as that shown in FIG. 3 to provide higher capacity. However, such higher capacity will, in general, require higher signal to interference-plus-noise ratio (SINR) over a significant percentage of a cell's coverage area. In general, the achievement of higher SINR will require smaller cells or, rather, operation in a smaller region of a cell when transmitting at a given power level. Hence, the current network model of higher power outdoor macro cells will need to be augmented by a set of lower power indoor and outdoor micro- and pico-cells in order to increase system capacity and mobile station throughput. As used herein, a mobile station may refer to wireless devices such as mobile telephones, smart phones, personal digital assistants (PDAs), handheld devices, portable computers, tablet computers, and similar devices or other user equipment (UE) that has telecommunications capabilities. Such mobile stations may likewise refer to a mobile wireless device, or conversely, to devices that have similar capabilities that are not generally transportable, such as desktop computers, set-top boxes, or sensors. Those of skill in the art will be are of the existence of many such examples of a mobile station exist and the foregoing is not intended to limit the spirit, scope or intent of the disclosure.

This move towards smaller cells will significantly increase the number of APs in the system and will also lead to significant coverage overlap, both planned and unplanned, as shown in FIG. 3. As a result, adjacent channel interference can occur when overlapping cells are operating in adjacent portions of the radio spectrum using either the same or different radio access technologies. Likewise, co-channel interference can occur when overlapping cells are operating in the same portion of the radio spectrum. While use of different radio access technologies is technically possible in these instances, many regulatory regimes restrict the use of a spectrum band to a single radio access technology or to a single licensed operator.

While transmission and reception within a given cell will be coordinated by its corresponding AP, operation across cell boundaries may be un-coordinated due to the vagaries of radio propagation, differences or incompatibilities between administrative domains, or difficulties encountered in communicating between APs. However, completely un-coordinated operation may ultimately result in unacceptable levels of interference that could negate the benefits of improved signal levels garnered through the use of smaller cells.

Accordingly, there is a corresponding need for the mitigation of interference to enhance performance, which requires cooperation between the aforementioned APs. However, some deployments may not have reliable, or for that matter any, direct communication paths (e.g., physical backhaul) between APs. As a result, interference mitigation cannot occur as there is no mechanism for one AP to cooperate with another AP. Furthermore, realization of real-time channel-dependent cooperation between multiple APs may be unachievable if any available direct communication paths are unable to sustain sufficient throughput.

Various approaches to this issue are known, including having APs communicate either directly through physical backhaul networks or through a centralized control structure to coordinate communications. One approach is for the AP to coordinate mobile stations to be transmitted to and the resources to be transmitted. Another approach is to have the AP to act as a master manager for a set of radio resources. In one such example, a zone of resources can be specified for coordinated transmission as described in greater detail herein. However, this approach requires not only the aforementioned direct communication between APs, but also a means to converge mobile station selection and resource assignment between various APs. Furthermore, this coordination is also limited to the resources specified within the zone.

Those of skill in the art will be aware that inter-cell interference is a known cause of decreased system capacity in cellular deployments. Various approaches to this issue include the implementation of interference mitigation techniques. For example, the MS or the AP may cancel dominant interfering signals. As another example, based on channel quality and residual interference, mobile stations can assist the AP in coordinating available radio resources that are assigned amongst themselves. As yet another example, the AP or MS can avoid dominant interferers by beam-forming or proper antenna beam selection.

However, in a heterogeneous cellular deployment, the APs and the mobile stations may have different capabilities, such as different transmit power levels, different interference management capabilities, etc. Furthermore, the interference rejection capabilities of the AP and the MS may vary based on the type of receiver used. Moreover, the receiver techniques employed at the AP and the MS are typically proprietary and not available for other APs or mobile stations within the system. Accordingly, the application of the aforementioned interference mitigation methods may not improve the system performance across the network.

Figure 4:
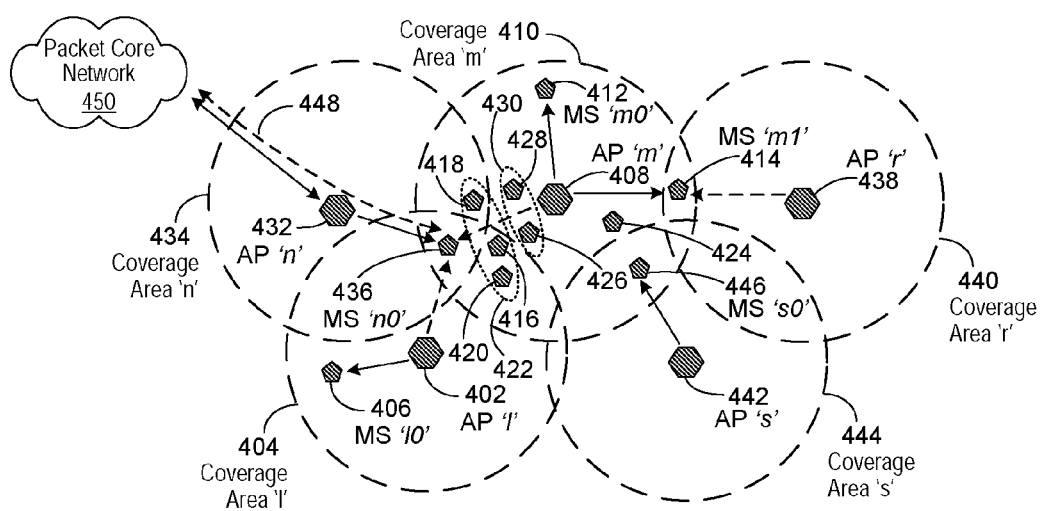
FIG. 4 is a simplified topological diagram showing inter-cell interference management using interference cancellation and coordination.

FIG. 4 is a simplified topological diagram showing inter-cell interference management using interference cancellation and coordination as implemented in accordance with an embodiment of the disclosure. As used herein, mobile station (MS) 'ip' refers to the $p^{th}$ MS served by an access point (AP) 'i'. In this embodiment, access points 'l' 402, 'm' 408, 'n' 432, 'r' 438, and 's' 442 have corresponding coverage areas 'l' 404, 'in' 410, 'n' 434, 'r' 440, and 's' 444. As shown in FIG. 4, AP '/' 402 is the serving AP for mobile station (MS) 'l0' 406 and AP 'm' 408 is the serving AP for mobile stations 'm0' 412, 'm1' 414, 'm2' 416, 'm3' 418, 'm4' 420, 'm5' 424, 'm6' 426, and 'm7' 428. Likewise, AP 'n' 432 is the serving AP for MS 'n0' 436 and AP 's' 442 is the serving AP for MS 's0' 446. As likewise shown in FIG. 4, the group 430 of mobile stations 'n16' 426, and 'n17' 428 are closer to their serving AP, while the group 422 of mobile stations 'n12' 416, 'n13' 418, 'n14' 420 are further away from their serving AP. In this embodiment, MS 'n0' 436 connects 448 to the packet core network 450 through its serving AP, AP 'n' 432 via the appropriate network interface.

Referring to FIG. 4, it will be apparent to those of skill in the art that the quality of downlink (DL) signal reception at MS 'n0' 436, served by AP 'n' 432, may be degraded by signal transmissions from neighboring APs 'm' 408 and 'l' 402. It will likewise be apparent that MS 'n0' 436 will experience interference if AP 'n' 432 assigns the same radio resources to MS 'n0' 436 that AP 'in' 408 assigns to MS 'n12' 416. More specifically, interference will be experienced by MS 'n0' 436 as AP 'm' 408 has to increase its transmission power to serve its cell-edge mobile stations, such as MS 'm2' 416. However, MS 'n0' 436 and MS 'm2' 416 can successfully achieve effective suppression of the dominant interference, dependent upon the type of receivers they use.

It will likewise be appreciated that the interference signal strength experience by MS 'n0' 436 will be reduced if the same resources are used to serve mobile stations 'm6' 426, and 'm7' 428. More specifically, AP 'm' 408 requires less transmission power to serve mobile stations 'm6' 426, and 'm7' 428 as they are closer to their serving AP. Likewise, if AP 'm' 408 is capable of beam forming, and if AP 'm' 408 uses the same resources to serve mobile stations 'm0' 412, 'm5' 424, or 'm6' 426, then it can completely avoid interfering with the reception of MS 'n0' 436. It will be further appreciated that the interference suppression capability of an AP is dependent upon its inter-AP coordination capabilities, interference cancellation/rejection capabilities, and beam forming capabilities and further depends on the MS's interference management capabilities. For example, the number of dominant interferers a MS can successfully suppress is dependent upon the number of its receiver antennas.

Skilled practitioners of the art will be aware that within existing cellular standards, interference cancellation is first applied, and then independently followed by either interference coordination or interference avoidance. However, in a heterogeneous deployment, not all APs are equipped to perform either interference coordination or interference avoidance, or both. Similarly, various APs may not know whether an individual MS can support interference cancellation techniques. Likewise, interference cancellation varies according to the nature of the interferers observed by the MS or AP. In some cases, one dominant interferer can be cancelled. In other cases, there may be no dominant interferer and therefore it may not be possible to apply interference cancellation. Furthermore, the transmitting radio does not have the knowledge as to how many, and which, interferer can be cancelled in current configurations. Accordingly, there is currently no coordination between the application of interference cancellation and interference co-ordination management techniques. However, overall network performance can be optimized if the interference management capabilities of various APs and mobile stations in a heterogeneous network environment are known and utilized appropriately.

In various embodiments, inter-cell interference mitigation approaches are opportunistically implemented in a heterogeneous network environment to enable the use of interference cancellation and interference avoidance techniques, followed by the use of interference coordination techniques for those interferers that cannot be cancelled or avoided. In these various embodiments, enabling a combination of the aforementioned interference cancellation, interference avoidance, and interference coordination techniques at the MS and or AP entail potential dependencies.

For example, the effectiveness of interference cancellation may depend upon the number of receive antennas, and the type of receiver, used by the MS. To further the example, if a MS has $N_R$ receive antennas, with a maximal ratio combining (MRC) receiver, the MS can effectively suppress $N_R-1$ dominant interferers. Those receivers with interference rejection combining (IRC) capabilities can improve the interference suppression capabilities beyond $N_R-1$ dominant interferers. Likewise, there are various successive and iterative interference cancellers are known in the art. Furthermore, when information is transmitted over multiple layers, some of the receive antennas are used to receive multiple-input and multiple-output (MIMO) transmissions and inter-cell interference suppression capability may be reduced. Moreover, the success of various interference mitigation techniques may vary based on the relative power levels of the desired signal and the interfering signals. For example, if the AP and the MS are capable of beam forming, or switched beams, the resources can be managed much more efficiently.

As another example of a potential dependency, the resource scheduling decisions at each AP is influenced by the resource usage at the neighboring APs. In the heterogeneous network environment described in FIG. 3, there is a possibility of the APs not having communication capabilities amongst themselves. In such cases, the resource coordination to manage the inter-cell interference is performed with the help of a MS as described in greater detail herein. Other examples of potential dependencies include the ability of neighboring APs to communicate with each other (e.g., via a direct wire-line or wireless backhaul link or through a MS) and for a MS to communicate with neighboring APs.

Figure 5:
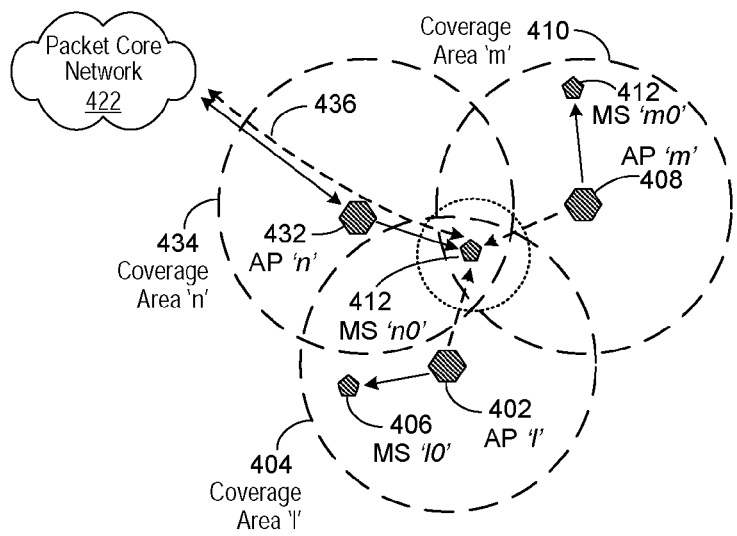
FIG. 5 is a simplified topological diagram showing inter-cell interference management using radio resource assignment on the downlink.

FIG. 5 is a simplified topological diagram showing inter-cell interference management using radio resource assignment on the downlink as implemented with interference cancellation and coordination in accordance with an embodiment of the disclosure. As used herein, mobile station (MS) 'ip' refers to the $p^{th}$ MS served by an access point (AP) 'i'. As shown in FIG. 5, mobile station (MS) 'n0' 436 is connected to the network through the access point (AP) 'n' 432. Likewise, MS 'm0' 412 and MS 'l0' 406 are respectively connected to the network via access points AP 'm' 408 and AP 'l' 402. As shown in FIG. 5, downlink (DL) transmissions from AP 'm' 408 and AP 'l' 402 may interfere with the downlink transmission from AP 'n' 432 to MS 'n0' 436 if the same space-time-frequency resources are assigned to these DL transmissions. In this embodiment, the received signal at MS 'n0' 436 can be expressed as follows:

$$R_{ij} = R_{ij}^n + R_{ij}^m + R_{ij}^l + N_{ij}$$

Where $R_{ij}^p$ is the received sample from a given AP 'p' over the time-frequency resource (i,j). Likewise, $N_{ij}$ represents the noise and other interfering signals over the time-frequency resource (i,j).

In this embodiment, if MS 'n0' 436 is capable of suppressing one interferer, and further, if it prefers AP 'l' 402 as the manageable interferer, then MS 'n0' 436 appropriately notifies AP 'l' 402, 'm' 408, and 'n' 432 of its preference. It will be appreciated that the preference of MS 'n0' 436 may depend on the specifics of the interference cancellation technique implemented and the transmission parameters of the other APs, such as modulation, coding, transmit power etc. Likewise, MS 'n0' 436 may indicate its preferred transmission parameters to the preferred interfering AP, for example, AP 'l' 402. Accordingly, AP 'l' 402 may then schedule those resources, which the AP 'n' 432 is assigning to MS 'n0' 436, to an appropriate MS (e.g. MS 'l0' 406) which satisfies the preferences of MS 'n0' 436. Likewise, AP 'm' 408 may assign these resources to a MS (e.g. MS 'm0' 412) which can cause less performance degradation to MS 'n0' 436.

For example, the preceding equation can be re-written as follows:

$$R_{ij} = \sqrt{L^n} C_{ij}^n \sqrt{T^n} S_{ij}^n + \sqrt{L^m} C_{ij}^m \sqrt{T^m} S_{ij}^m + \sqrt{L^l} C_{ij}^l \sqrt{T^l} S_{ij}^l + N_{ij}$$

Where $L^P$ is the path loss between a given AP 'p' and MS 'n0' 436, $S^P$ is the symbol transmitted by the given AP 'p' at transmit power level $T^p$ (E [$\|S_{ij}^p\|^2$]=1), $C_{ij}^p$ is the complex channel weight associated with the communication link between the given AP 'p' and MS 'n0' 436, where $C_{ij}^p \in \mathbb{N}(0,1)$ is the zero mean complex Gaussian with unit variance.

Accordingly, if MS 'n0' 436 has a parallel or joint interference canceling receiver, then a preferred or manageable interfering AP is one from which MS 'n0' 436 has average receive signal power close to $L''T''$. However, if MS 'n0' 436 has a successive interference canceling receiver, then a preferred or manageable interfering AP is one from which MS 'n0' 436 has average receive signal power different from $L''T''$ at least by γ or specifically: $\gamma_1 \leq |L''T'' - L^pT^{p'''}| \leq \gamma_2$. For joint or successive interfering cancellation receivers, the manageable interferer can be semi-statically configured since it is decided by the relative average receive signal power. In one embodiment, MS 'n0' 436 is capable of suppressing two interferers. In this embodiment, both AP 'm' 408 and 'l' 402 assign the resources accordingly.

From the foregoing, it will be apparent that an AP can optimally assign its available DL radio resources to a MS, and mitigate interference, by knowing both the capabilities of the target MS and the transmission parameters of the neighboring APs. It will likewise be apparent that radio resource management (RRM) for a given AP may be influenced by a number of factors, such as the interference management capabilities of its neighboring APs and that of mobile stations attached to the network via its neighboring APs.

These interference management capabilities may include interference suppression capabilities, receive antenna configurations, etc. Other capabilities may likewise include measuring and reporting path loss or average receive power between the MS and neighbor APs to its serving cell. For example, the MS may be able to inform neighboring APs of future resource assignments. Likewise, the set of mobile station that influence the RRM decision may be restricted to those whose DL received signal see significant interference from a neighbor AP. Accordingly, each MS can select its preferred method of interference mitigation technique, which may or may not require interfering AP's assistance as described in greater detail herein, and likewise notify the interfering AP about its desire to do so. It will likewise be apparent that the interfering AP may or may not decide to accept the mobile station's request. Other interference management capabilities include the capabilities of the neighboring APs, such as pre-coding, beam forming, etc. In various embodiments, the pre-coding capabilities include closed loop multi-transmit antenna processing techniques such as, CL-MIMO/digital beam forming, interference alignment techniques, etc.

Figure 6:
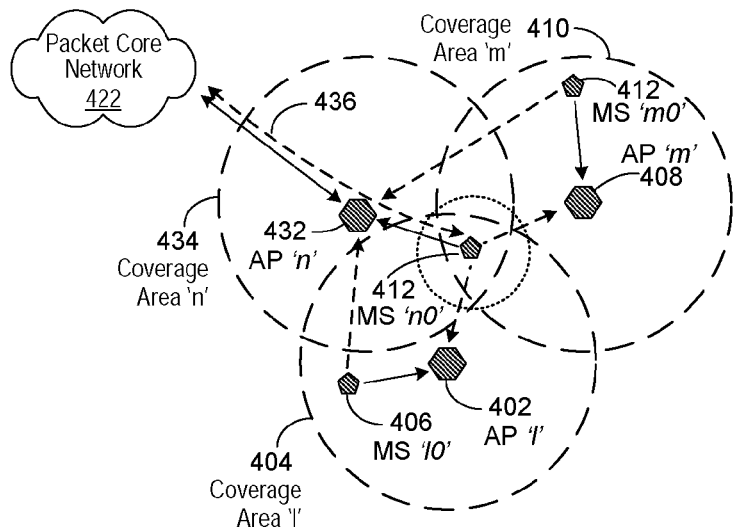
FIG. 6 is a simplified topological diagram showing inter-cell interference management using radio resource grant on the uplink.

FIG. 6 is a simplified topological diagram showing intercell interference management using radio resource grant on the uplink as implemented with interference cancellation and coordination in accordance with an embodiment of the disclosure. As used herein, mobile station (MS) 'ip' refers to the $p^{th}$ MS served by an access point (AP) 'i'. As shown in FIG. 6, MS 'n0' 436 is transmitting to its serving AP, AP 'n' 432. In this embodiment, MS 'm0' 412 and MS 'l0' 406 may likewise be respectively transmitting to AP 'm' 408 and AP 'l' 402 on the same resources. Accordingly, AP 'n' 432 receives wanted signals from MS 'n0' 436 and unwanted signals from MS 'm0' 412 and MS 'l0' 406. The received signal at MS 'n0' 436, $R_{ij}$ can be expressed as follows:

$$R_{ij} = R_{ij}^{n0} + R_{ij}^{m0} + R_{ij}^{l0} + N_{ij}$$

Where $R_{ij}^p$ represents the received signal at AP 'n' 432 from a given mobile station (MS) 'p'.

In this embodiment, if AP 'n' 432 is capable of canceling one dominant interferer, then AP 'm' 408 and AP 'l' 402 can grant the same radio resources to appropriate mobile stations within their respective cells such that there is little or insignificant performance degradation at AP 'n' 432. It will be appreciated that the performance degradation at AP 'n' 432 is dependent on the type of interference cancellation receiver used by AP 'n' 432, such as successive interference cancellation, parallel/joint interference cancellation, etc. It will likewise be appreciated that the neighboring AP is capable of granting the same resources to a MS in its coverage area only when the grant satisfies the interference cancellation requirements of the serving AP. However, if AP 'n' 432 is not capable of canceling the interference, then the neighboring APs may avoid granting those resources to its MS or grant those resources to its MS which does not create significant performance degradation at AP 'n' 432.

For example, the preceding equation can be re-written as follows:

$$R_{ij} = \sqrt{L^{n0}} C_{ij}^{n0} \sqrt{T^{n0}} S_{ij}^{n0} + \sqrt{L^{m0}} C_{ij}^{m0} \sqrt{T^{m0}} S_{ij}^{m0} + \sqrt{L^{l0}} C_{ij}^{l0} \sqrt{T^{l0}} S_{ij}^{l0} + N_{ij}$$

Where $L^{np}$ is the path loss between AP 'n' 432 and a given MS 'np', SP is the symbol transmitted by the given MS 'np' at transmit power level $T^{np}$, and $C_{ij}^{np}$ is the complex channel gain associated with the communication link between AP-n and the given MS 'np'.

Accordingly, AP 'n' 432 can elect to schedule MS 'n0' 436 at the same time as a predetermined MS that is associated with either AP 'm' 408 or AP 'l' 402 as its manageable interferer, based on the expected average signal power from the predetermined MS. More specifically, to optimize the probability of interference suppression, AP 'n' 432 may schedule MS 'n0' 436 at the same time as whichever neighboring AP has a MS whose anticipated received signal strength (RSS) is satisfying the required criterion of its interference cancellation receiver. Likewise, the uplink (UL) radio resources available at an AP are granted to the UL transmissions by knowing the interference management capabilities of neighboring APs. More specifically, the UL RRM at an AP is influenced by the interference management capabilities (e.g., beam forming) of mobile stations being served by its neighboring APs. These capabilities may include the ability of a MS to communicate with neighboring APs for reporting the resources granted for its future UL transmission and also reporting path loss measurements that are related to the neighboring APs to its serving AP. These capabilities likewise include the interference suppressing capabilities of the neighboring APs and any specific requirements on transmission parameters to suit its interference cancellation receiver.

Figure 7:
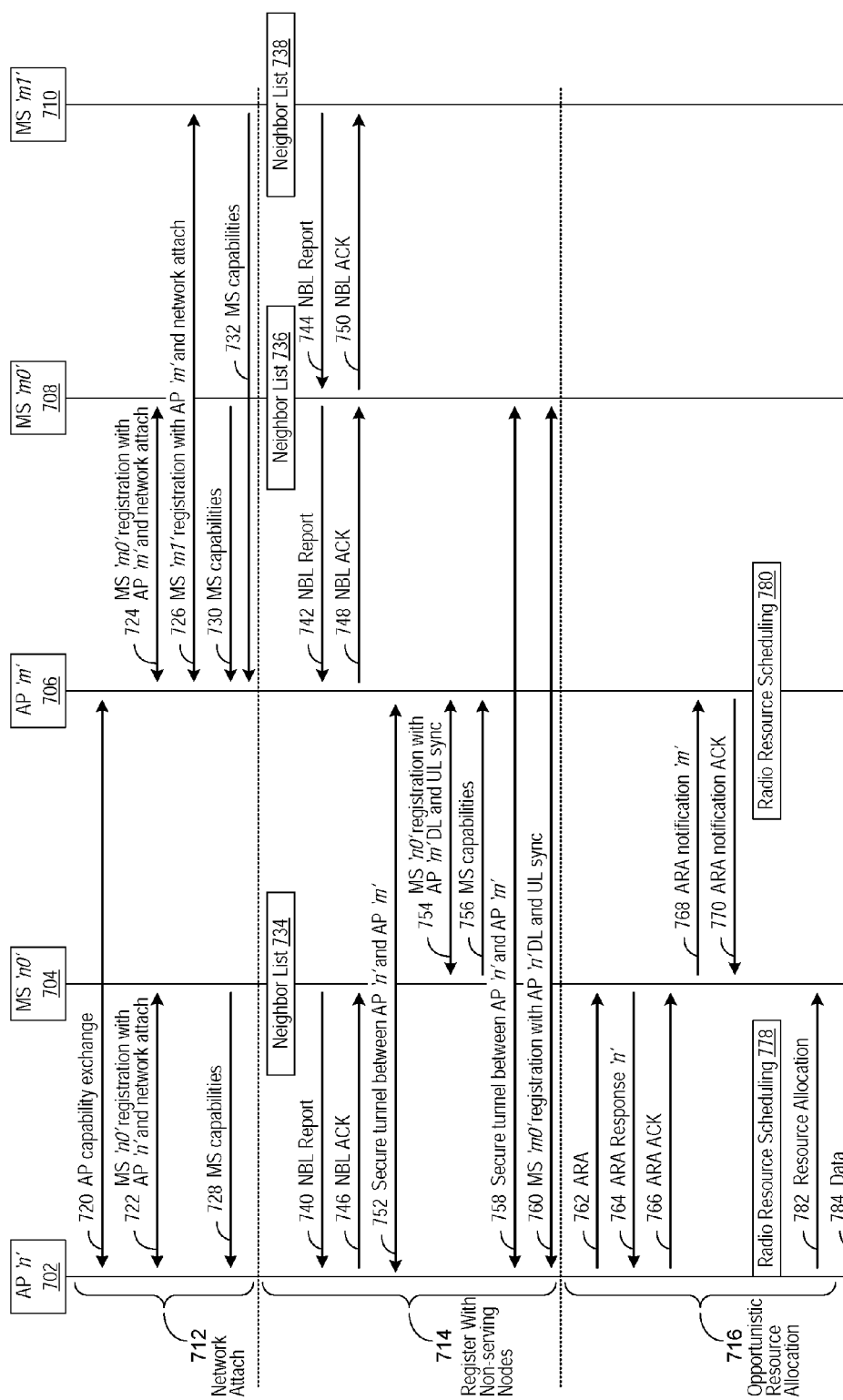
FIG. 7 shows a process signal flow of device-assisted interference management over the downlink (DL) to perform opportunistic DL radio resource management (RRM) operations.

FIG. 7 shows a process signal flow of device-assisted interference management over the downlink in accordance with an embodiment of the disclosure to perform opportunistic downlink (DL) radio resource management (RRM) operations. In this and various other embodiments, access points and mobile stations may or may not have interference cancellation or interference avoidance capabilities. Furthermore, mobile stations are not only able to communicate with neighboring access points, but also the neighboring access points are able to communicate between themselves via backhaul or a mobile station acting as an intermediary. Moreover, mobile stations that are not actively transmitting or receiving data packets are operable to make measurements of access points to determine dominant interferers on the downlink. In these various embodiments, the opportunistic DL RRM operations comprise a network attachment ("attachment") 712 phase, a registration with non-serving nodes ("registration") 714 phase, and a resource allocation ("allocation") 716 phase.

Referring now to FIG. 7, the attachment 712 phase is begun, starting with step 720, where AP 'n' 702 and a neighboring access point (AP), AP 'm' 706 exchange their capabilities, either via a direct wire-line or wireless backhaul interface or via mobile station which is connected to or actively communicating with at least one of these APs. It will be appreciated that while only AP 'n' 702 and AP 'm' 706 are shown in FIG. 7, in practice, AP 'n' 702 would communicate its capabilities to all known neighboring APs, and vice versa, in the bidirectional exchange shown in step 720. It will likewise be appreciated that this exchange would occur during an initial installation or whenever capabilities change within each of the APs. In various embodiments, the capability information is sent via backhaul or via the respective access links through a MS that is connected to at least one or more of these APs. Likewise, when (MS) 'n0' 704 reports the neighbor list measurements to its serving AP (e.g., AP 'n' 702), the serving AP considers the neighboring APs (e.g., AP 'm' 706) that are capable of performing opportunistic interference cancellation (IC)/interference avoidance (IA) RRM operations as manageable APs as described in greater detail herein.

In step 722, MS 'n0' 704 performs a network attach procedure by first registering with AP 'n' 702 to satisfy AP selection criteria. For example, the AP selection criteria may be the highest received signal power or lowest path loss. Another example would be the highest signal quality and lowest path loss. Other examples include any combination of signal quality, received signal power, and path loss. In step 724 and 726, MS 'm0' 708 and MS 'm1' 710 likewise perform network attach procedures with AP 'm' 706. In certain embodiments, the MS (e.g., mobile stations 'n0' 704, 'm0' 708 and 'm1' 710) may establish a secure tunnel with the network during the registration portion of the network attach procedure for the purpose of authentication procedures. During the authentication procedure, the network and the MS establish all the relevant encryption keys for future communications. If the MS does not have any data transaction, the network may initiate the idle mode entry procedure.

Then, in step 728, MS 'n0' 704, as part of the interference management capability exchange, sends its own capabilities to its serving AP, AP 'n' 702. The serving AP will subsequently use this information whenever resources are allocated or granted to MS 'n0' 704 while it is attached to the network. In this and various other embodiments, the capability information may include interference mitigation capability, the number of transmit and receive antennas, and other related information. In steps 730 and 732, MS 'm0' 708 and MS 'm1' 710 likewise perform capability exchange procedures with AP 'm' 706, which concludes the attachment phase 712.

The registration phase 714 is then begun, starting with steps 734, 736, and 738, where neighbor list measurements and selection of potential interfering APs are respectively performed by mobile stations 'n0' 704, 'm0' 708 and 'm1' 710. In this and various other embodiments, mobile stations 'n0' 704, m0' 708 and 'm1' 710 may perform the neighbor list measurements either autonomously or by request from their respective serving AP (e.g., APs 'n' 702 and 'm' 706). As shown in FIG. 7, the list of discovered neighbors are respectively reported back by mobile stations 'n0' 704, m0' 708 and 'm1' 710 to their serving AP for further processing in steps 740, 742, and 744. In turn, the serving AP (e.g., APs 'n' 702 and 'm' 706) may shortlist the reported list of APs based on the AP's capabilities to accommodate those APs that cooperate with the other APs in the network. If so, then the serving AP sends an acknowledgement message to each respective MS with the shortlisted neighbor list in steps 746, 748, and 750. In various embodiments, the measurement reporting procedure may be repeated whenever there is significant change in received signal quality, for example, signal to interference-plus-noise ratio (SINR). It will be appreciated that mobile stations 'n0' 704, 'm0' 708 and 'm1' 710 may have to establish downlink synchronization with the selected neighboring APs.

A secure tunnel is then established in step 752 between APs 'n' 702 and 'm' 706, as well as the aforementioned short list of neighboring APs for future communications related to MS registrations and authentication procedures. In various embodiments, the establishment of the secure tunnel may be for a specific MS registration or it may be time-based. In the case of the establishment of the tunnel being time based, security keys will be exchanged either periodically or whenever an event occurs. As such, the secure tunnel is used by the APs to exchange information associated with the mobile stations (e.g., mobile stations 'n0' 704, 'm0' 708 and 'm1' 710) that will be respectively registering with the APs (e.g., APs 'n' 702 and 'm' 706), which will be indicated in the initial access message from the MS to the AP.

After the secure tunnel has been established between APs 'n' 702 and 'm' 706 in step 752, MS 'n0' 704 registers itself with cooperating APs (e.g., AP 'm' 706) in step 754, following instructions provided by its serving AP, AP 'n' 702. As used herein, a cooperating AP refers to a neighboring non-serving AP. In various embodiments, the serving AP, AP 'n' 702 assigns a unique ID to MS 'n0' 704 for the purpose of registering with AP 'm' 706 and other cooperating APs. In these various embodiments, MS 'n0' 704 may have to establish uplink (UL) synchronization with the all the neighboring APs in the aforementioned shortlist. Then, in step 756, MS 'n0' 704 provides its capabilities to AP 'm' 706 and other cooperating APs. Thereafter, a secure tunnel is established between APs 'n' 702 and 'm' 706 in step 758 to facilitate the registration and authentication of MS 'm0' 708 with AP 'n' 702, followed by the registration of MS 'm0' 708 with AP 'n' 702 for DL and UL synchronization in step 760. It will be appreciated that the establishment of a secure tunnel is not necessary if a secure tunnel is already established, and not expired, between the two APs.

The allocation phase 716 is then begun, starting with step 762, where the serving AP, AP 'n' 702 sends an advanced resource allocation (ARA) to MS 'n0' 704. Based on the channel quality measure (CQM), MS 'n0' 704 selects a subset of the resource blocks allocated. In various embodiments, AP 'n' 702 may select an overlapping set of resources to each MS it is serving. In these various embodiments, the size of the overlapping resources between the various ARA maps may be decided by the CQM feedback from all served mobile stations. An ARA response is then received by AP 'n' 702 in step 764. In certain of these embodiments, the preferred subset of resources are indicated by the MS (e.g., MS 'n0' 704) to the serving AP (e.g., AP 'n' 702) as part of the response message. The resources are then selected by MS 'n0' 704 from the time and frequency resource blocks, or groups of resource blocks, indicated in the ARA.

An ARA acknowledgement (ACK) message is then sent by AP 'n' 702 to MS 'n0' 704 in step 766. In certain embodiments, the ACK message may indicate that the serving AP (e.g., AP 'n' 702) can't fulfill, or can only partially fulfill, the request from MS 'n0' 704, which may likewise result in cancellation of resource assignment. In turn, MS 'n0' 704 sends a corresponding ARA notification to neighboring APs (e.g., AP 'm' 706) in step 768. In certain embodiments, MS 'n0' 704 may indicate to the neighboring AP whether or not it is treating that AP as a manageable interferer. As used herein, and as described in greater detail herein, a manageable interferer refers to an interferer that can be successfully suppressed by MS 'n0' 704. In these and other embodiments, MS 'n0' 704 may indicate the path loss observed with respect to each respective neighboring AP and the maximum received signal strength that it can tolerate. Likewise, MS 'n0' 704 may indicate more than two APs as interferers if it can effectively cancel multiple dominant interferers. In certain embodiments, AP 'n' 702 may likewise send ACK messages based on the load conditions at the neighboring APs (e.g., AP 'm' 706). For example, if one neighboring AP has a low load, then AP 'n' 702 may indicate that AP for coordination and a second, more highly-loaded AP may be treated as a manageable interferer. In these embodiments, the APs may respectively indicate either their preference, or their system load, to MS 'n0' 704 beforehand. Thereafter, the neighboring APs (e.g., AP 'm' 706) sends an ARA ACK message in step 770, indicating their willingness, or ability, to cooperate.

In certain embodiments, the ARA ACK from the serving AP may consist of two information fields: field-1, which is intended for the neighboring APs and is protected by an encryption key shared between the serving AP and the neighboring APs, and field-2, which is intended for the MS. In these and other embodiments, the MS forms the ARA notification message by including information field-1 and appending its own interference management capabilities as described in greater detail herein. Alternatively, information field-1 can be exchanged over a direct interface between the APs if one is available. If so, then only information field-2 will be sent to the MS.

Resource scheduling is then respectively performed in step 778 and 780 by AP 'n' 704 and AP 'm' 706. In certain embodiments, steps 778 and 780 can occur at different times as it is not necessary to synchronize resource scheduling for all APs. In various embodiments, the serving AP (e.g., AP 'n' 702) evaluates the QoS requirements of MS 'n0' 704 and its preferred resource map that was received in the ARA/ARA response. The decided resources are then communicated to MS 'n0' 704 over the DL control channel. The resource allocator at the neighboring APs (e.g., AP 'm' 706) that are selected as manageable interferers may schedule a dominant MS (e.g., MS 'm0' 708) to contemporaneously use those same resources. When the neighboring AP transmits to a served MS (e.g., MS 'm0' 708) on the same resources, the transmit power is adjusted such that the received power at the interfered MS (e.g., MS 'n0' 704) is approximately equal to the maximum received signal strength it has requested. Accordingly, interference rejection performance can be maximized, such as when MS 'n0' 704 is performing joint interference cancellation. The serving AP (e.g., AP 'n' 702) then sends a final resource allocation message in step 782 to MS 'n0' 704, followed by the transfer of data in step 784.

In various embodiments, steps 764 and 766 can be performed after the step 770. In these and other embodiments, ARA message at step 762 may consist of a secure payload addressed to the neighboring APs 'm' 706. Likewise, MS 'n0' 704 may include a secure payload received from the neighbor APs 'm' 706 in an ARA response message sent to the serving AP 'n' 702. In certain of these embodiments, ARA ACK may only be addressed to MS 'n0' 704.

Figure 8A:
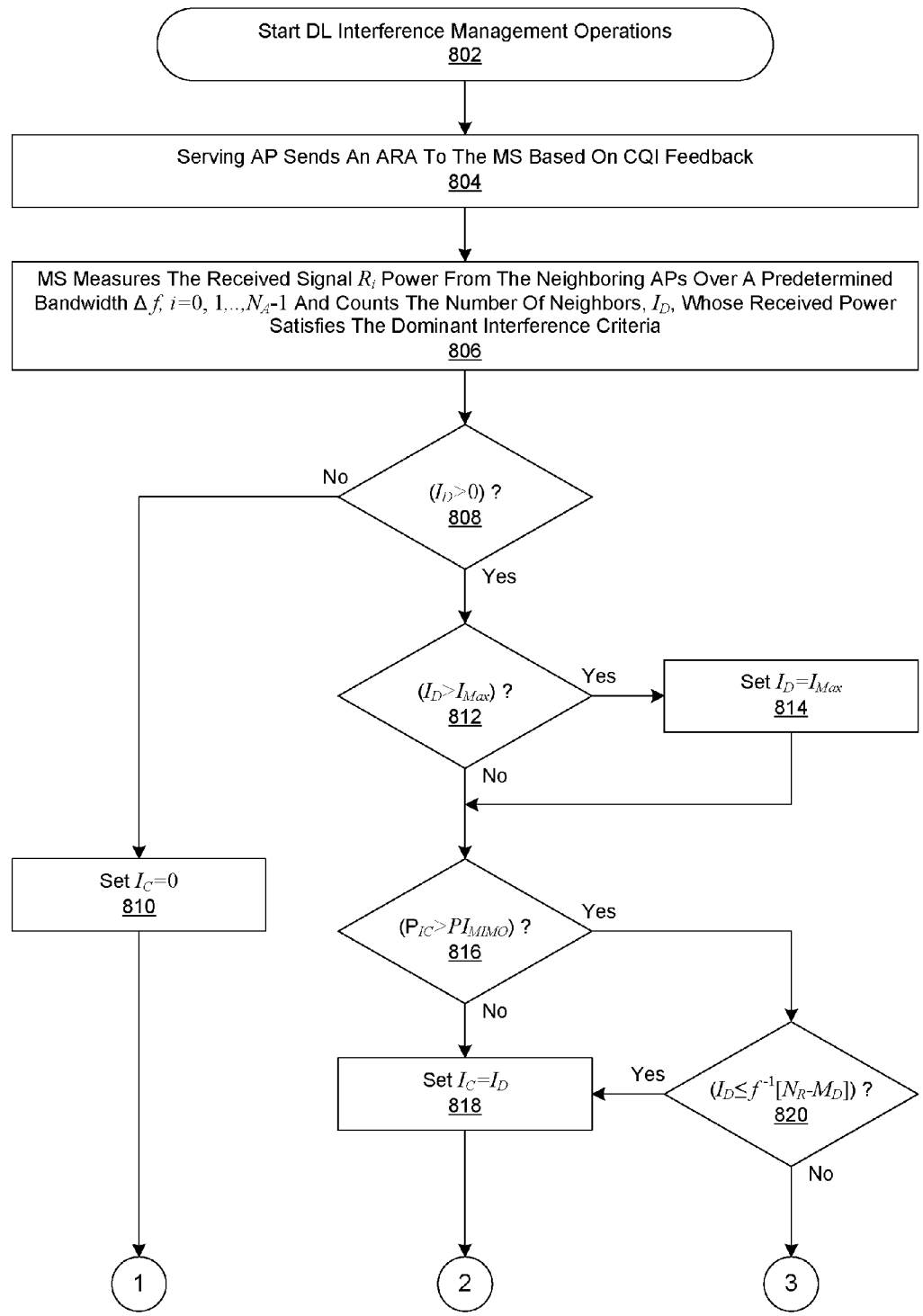
FIGS. 8a-b are a flowchart of the operations performed by a MS to manage inter-cell interference on the DL.
Figure 8B:
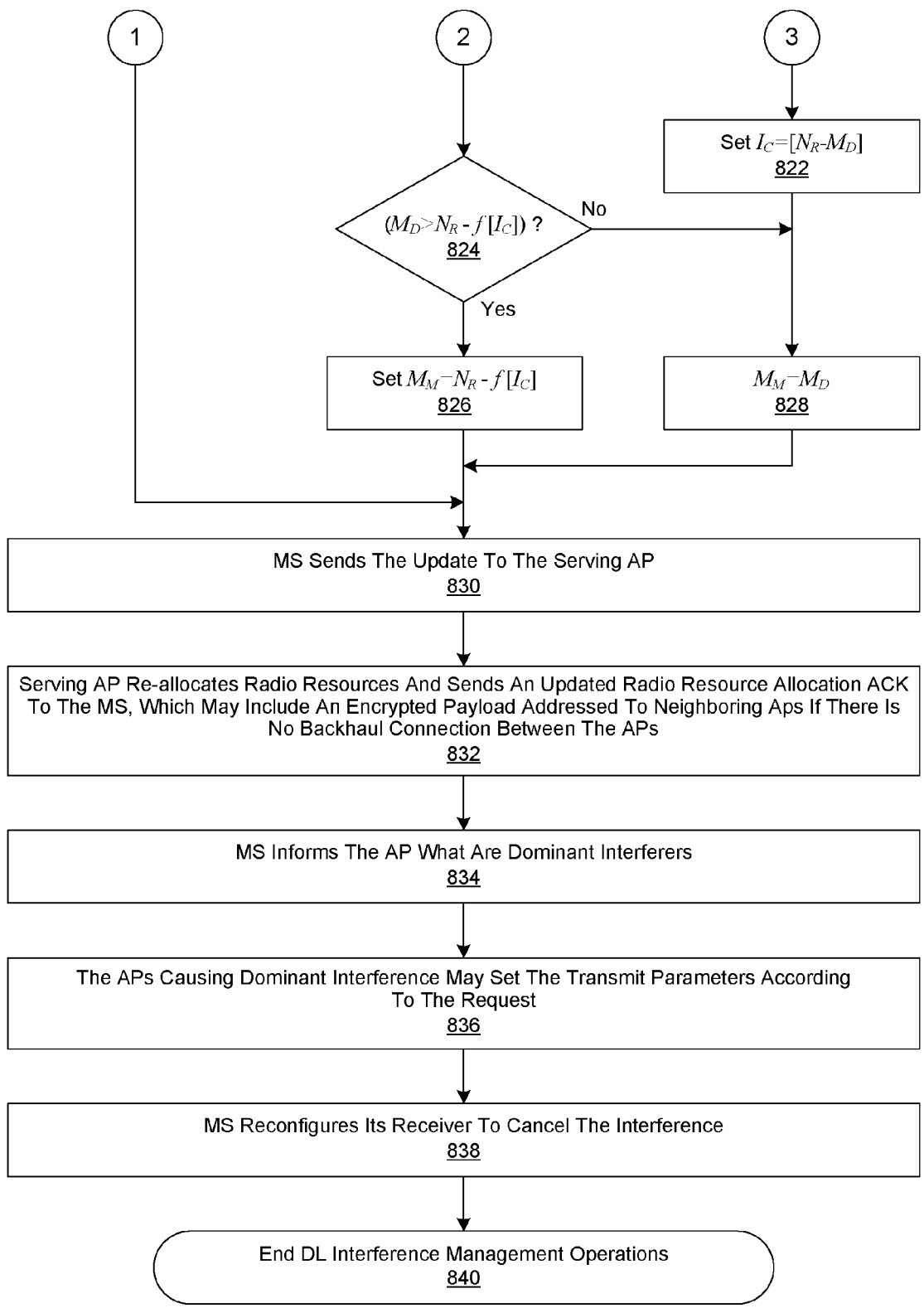

FIGS. 8a-b are a flowchart of the operations performed by a mobile station (MS) to manage inter-cell interference on downlink (DL) transmissions in accordance with an embodiment of the disclosure. In this embodiment, DL interference management operations are begun in step 802, followed by a serving access point (AP) sending an advanced resource allocation (ARA) to the MS in step 804, based on its channel quality indication (CQI) report. In step 806, the MS measures the received signal from all the neighboring APs. This can be performed, for example, by correlating the received signal with an AP specific reference signal, which is transmitted periodically by the APs. Accordingly the MS can determine the APs whose transmitted signal can be treated as dominant interferer. The criteria by which the dominance is determined may depend upon the type of interference-canceling receiver used by the MS. For example, as shown in step 806, $I_D$ neighbors will be determined to be dominant out of $N_A$ neighboring APs. In this and other embodiments, this procedure may be repeated periodically or whenever the serving AP sends an ARA message.

A determination is then made in step 808 whether $I_D>0$ to determine whether the available receive antennas will be shared between the MIMO order and interference cancellation purposes. If it is determined in step 808 that $I_D<0$, then $I_C$ is set to 0 in step 810. Otherwise, a determination is made in step 812 whether the number of dominant interferers ($I_D$) is greater than the maximum interference suppression capability ($I_{MAX}$) of the MS. If so, then $I_D$ is set to $I_{Max}$, in step 814, where $I_{Max}$ indicates the number of interfering signals the MS can successfully cancel with $N_R$ receive antennas.

Thereafter, or if it is determined in step 812 that $I_D<I_{Max}$, then a determination is made in step 816 whether $P_{IC}>PI_{MIMO}$. To do so, the MS checks the priority for interference cancellation, $P_{IC}$ and the priority for multiple-input/multiple-output (MIMO), $P_{MIMO}$. If it is determined in step 816 that the MIMO transmission is prioritized, then $I_D$ is reduced to equal $I_C$ (i.e., $I_C=I_D$) in step 818 such that the remaining antennas are used to suppress the interference after the requirement for MIMO is satisfied. More specifically, $I_C=f^{-1}[N_R-M_D]$, where $N_R$ represents the number of receive antennas at the MS and $M_D$ is the desired MIMO order (i.e. number independent information streams). The function $f^{-1}[x]$ represents the number of interferers that can suppressed by using x receive antennas.

However, if it is determined in step 816 that interference cancellation is prioritized, then a determination is made in step 820 whether $I_D \leq f^{-1}[N_R-M_D]$. More specifically, the MIMO order is calculated based on the remaining antennas after determining the number of antennas required to successfully cancel the interferers. If it is determined in step 820 that $I_D \leq f^{-1}[N_R-M_D]$, then $I_C$ is set to equal $N_R-M_D$ in step 822. Otherwise $I_D$ is reduced to equal $I_C$ (i.e., $I_C=I_D$) in step 818. A determination is then made in step 824 whether $M_D>N_R-f[I_C]$. If not, or if $I_C$ has been set to equal $N_R-M_D$ in step 822, then $M_M$ is set to equal $M_D$ (i.e., $M_M=M_D$) in step 828. If not, then $M_M$ is set to equal $N_R-f[I_C]$ in step 826.

Thereafter, or if $I_C$ has been set to equal 0 (i.e., $I_C=0$) in step 810, or if $M_M$ is set to equal $M_D$ (i.e., $M_M=M_D$) in step 828, then the MS may select a preferred resource set from the ARA set based on its dynamically assessed interference cancellation capabilities in step 830. In step 832, the serving AP allocates radio resources based on the MS response, such that the interference from those APs that cannot be cancelled is minimized or avoided. This message may consist of an encrypted payload addressed to the neighboring dominant interfering APs if there is no backhaul communication link between the APs. In step 834, the MS forwards the AP's new assignment to the neighboring APs, which are considered to be dominant interferers. In step 836, each of the dominant interfering APs respond to the MS with their willingness, or unwillingness, to set their transmit parameters according to the request from the MS. At step 838, the MS reconfigures its transmitter to cancel the interference and suppress the interferers, followed by DL interference management operations ending in step 840.

Figure 9:
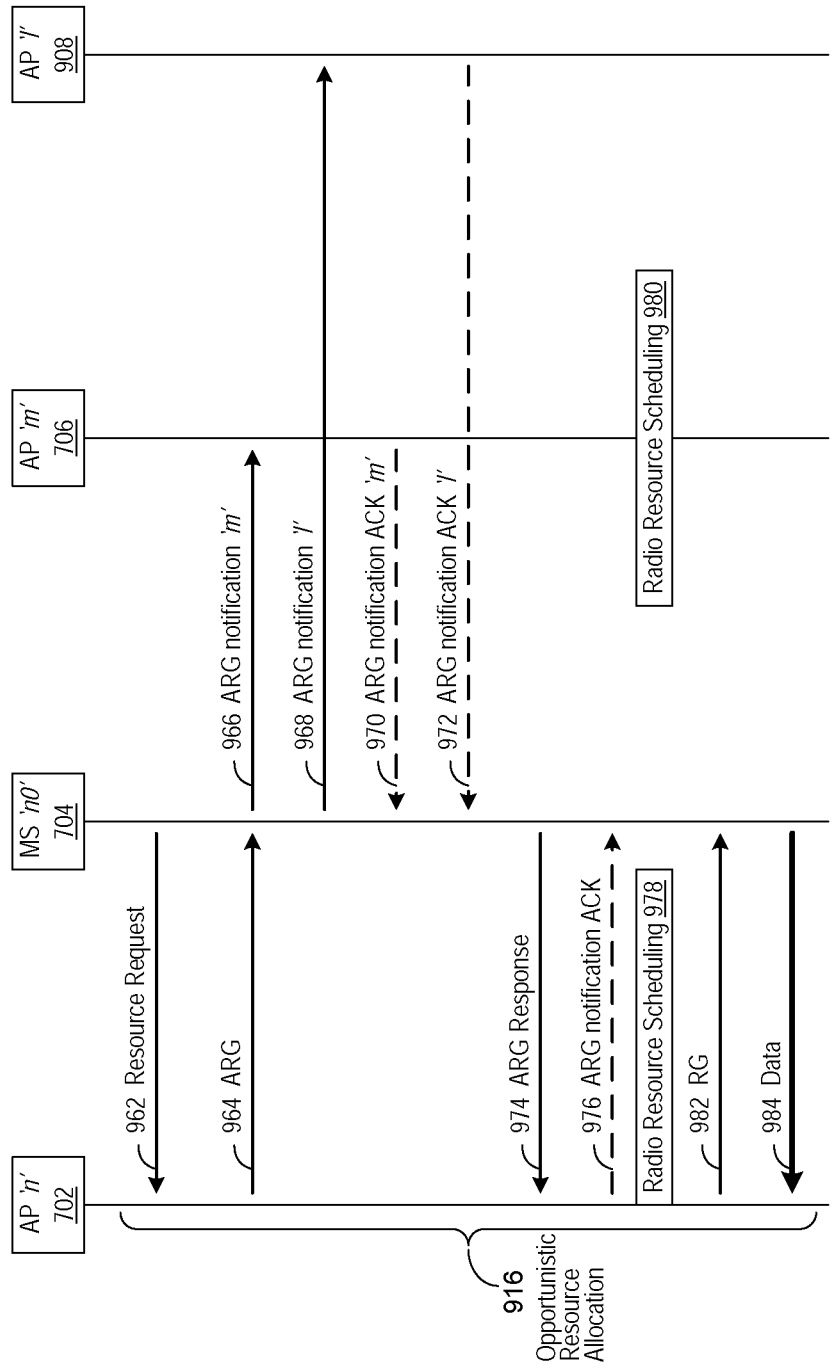
FIG. 9 shows a process signal flow of device assisted interference management over the uplink (UL) to perform opportunistic UL radio resource management (RRM)

FIG. 9 shows a process signal flow of device assisted interference management over the uplink in accordance with an embodiment of the disclosure to perform opportunistic uplink (UL) radio resource management (RRM). In this embodiment, the performance of opportunistic interference cancellation and interference coordination on UL is initiated by first performing the steps described in the descriptive text associated with FIG. 7 for the allocation network attachment ("attachment") 712 phase. Thereafter, the steps described for the registration with non-serving nodes ("registration") 714 phase, likewise described in the descriptive text associated with FIG. 7, are performed. However, the steps for the opportunistic resource allocation ("allocation") 916 phase, as shown in FIG. 9, are modified.

Referring now to FIG. 9, mobile station (MS) 'n0' 704 sends a request for UL resources in step 962 to access point (AP) 'n' 702, which is its serving AP. In response AP 'n' 702 sends an advanced resource grant (ARG) to MS 'n0' 704. In various embodiments, the granted resources are picked based on the channel quality measure (CQM) performed by the serving AP (e.g., AP 'n' 702) during the previous instants. It will be appreciated that this decision may be influenced by the residual interference seen by the serving AP over each block of radio resources. Accordingly, AP 'n' 702 may receive some information about interference related to a given resource by considering the past reports from the mobile stations served by neighboring APs (e.g., AP 'm' 706 or AP 'l' 908).

Then, in steps 966 and 968, MS 'n0' 704 respectively sends an ARG notification message to a preferred set of neighboring APs (e.g., AP 'm' 706 and AP 'l' 908). In various embodiments, the preferred set of neighboring APs may be selected based on the path loss between the neighboring AP and MS 'n0' 704. In certain embodiments, the set of neighboring APs is selected based upon the expected received power at those APs, the transmit power capabilities of MS 'n0' 704, and associated path loss metrics. In certain embodiments, MS 'n0' 704 may likewise include its transmit power level, and the path loss measured with respect to each of the neighboring APs (e.g., AP 'm' 706 and AP 'l' 908), in the notification message.

In certain embodiments, the ARG message from the serving AP 'n' 702 may consist of two information fields, field-1, which is intended for the neighboring APs that are protected by an encryption key shared between the serving AP 'n' 702 and the neighboring APs (e.g., APs 'm' 706 and AP 'l' 908), and field-2, which is intended for MS 'n0' 704. In these and other embodiments, MS 'n0' forms the ARG notification message by including information field-1 and appending its own interference management capabilities as described in greater detail herein. Alternatively, information field-1 can be exchanged over a direct interface between AP 'n' 702 and APs 'm' 706 and 'l' 908 if one is available. If so, then only information field-2 will be sent to the MS 'n0' 704.

In various embodiments, the neighboring APs (e.g., AP 'm' 706 and AP 'l' 908) may respectively send and acknowledgment (ACK) message in steps 970 and 972 to MS 'n0' 704. In certain of these embodiments, the ACK message may indicate that the neighboring AP is unable to fulfill, or can only partially fulfill the serving AP's (e.g., AP 'n' 702) intentions.

An ARG response message is then sent in step 974 by MS 'n0' 704 to its serving AP, AP 'n' 702. In various embodiments, MS 'n0' 704 may forward the ARG notification ACK received from the neighboring APs (e.g., AP 'm' 706 and AP 'l' 908) to its serving AP during step 974. In various embodiments, AP 'n' 702 may send and ARG response ACK message to MS 'n0' 704 in step 876 if any of the neighboring APs (e.g., AP 'm' 706 and AP 'l' 908) are unable to fulfill its request.

Resource scheduling is then respectively performed in step 978 and 980 by AP 'n' 704 and AP 'm' 706. In certain embodiments, steps 978 and 980 can occur at different times as it is not necessary to synchronize resource scheduling for all APs. In various embodiments, the serving AP (e.g., AP 'n' 702) evaluates the QoS requirements of MS 'n0' 704 and its preferred resource map that was received in the ARG/ARG response. The decided resources are then communicated to MS 'n0' 704 over the DL control channel. The resource allocator at the neighboring APs (e.g., AP 'm' 706 and AP 'l' 908) that are selected as manageable interferers may schedule a dominant MS to contemporaneously use those same resources. The serving AP (e.g., AP 'n' 702) then sends a final resource grant (RG) message in step 982 to MS 'n0' 704. Thereafter, MS 'n0' 704 begins the transfer of data to AP 'n' 702 in step 984, using the resources it was granted by AP 'n' 702. In certain embodiments, AP 'n' 702 may configure its receiver based on the interference signals received from the mobile stations served by neighboring APs (e.g., AP 'in' 706 and AP 'l' 908).

Figure 10A:
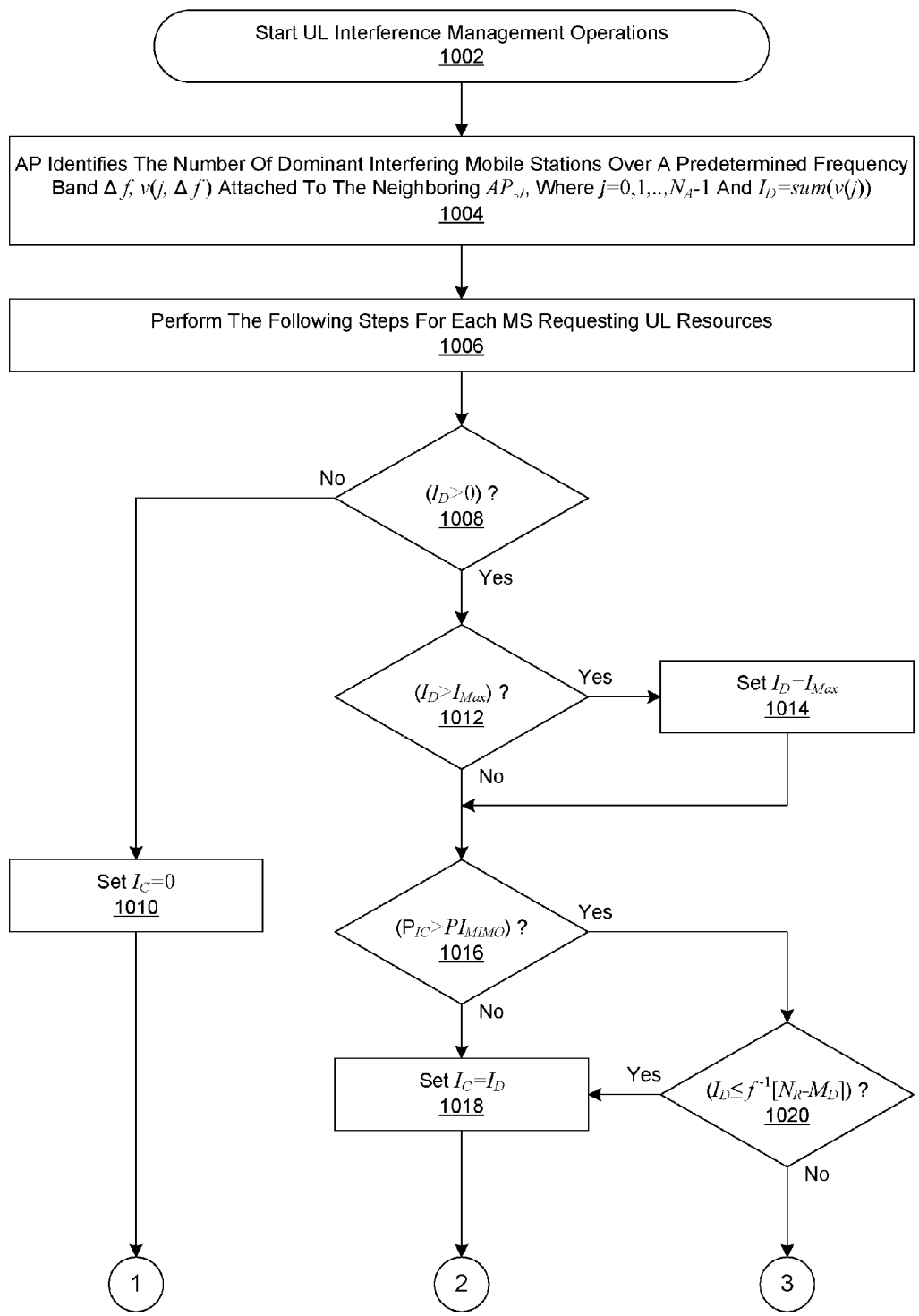
FIGS. 10a-b are a flowchart of the operations performed by an AP to manage inter-cell interference on the UL.
Figure 10B:
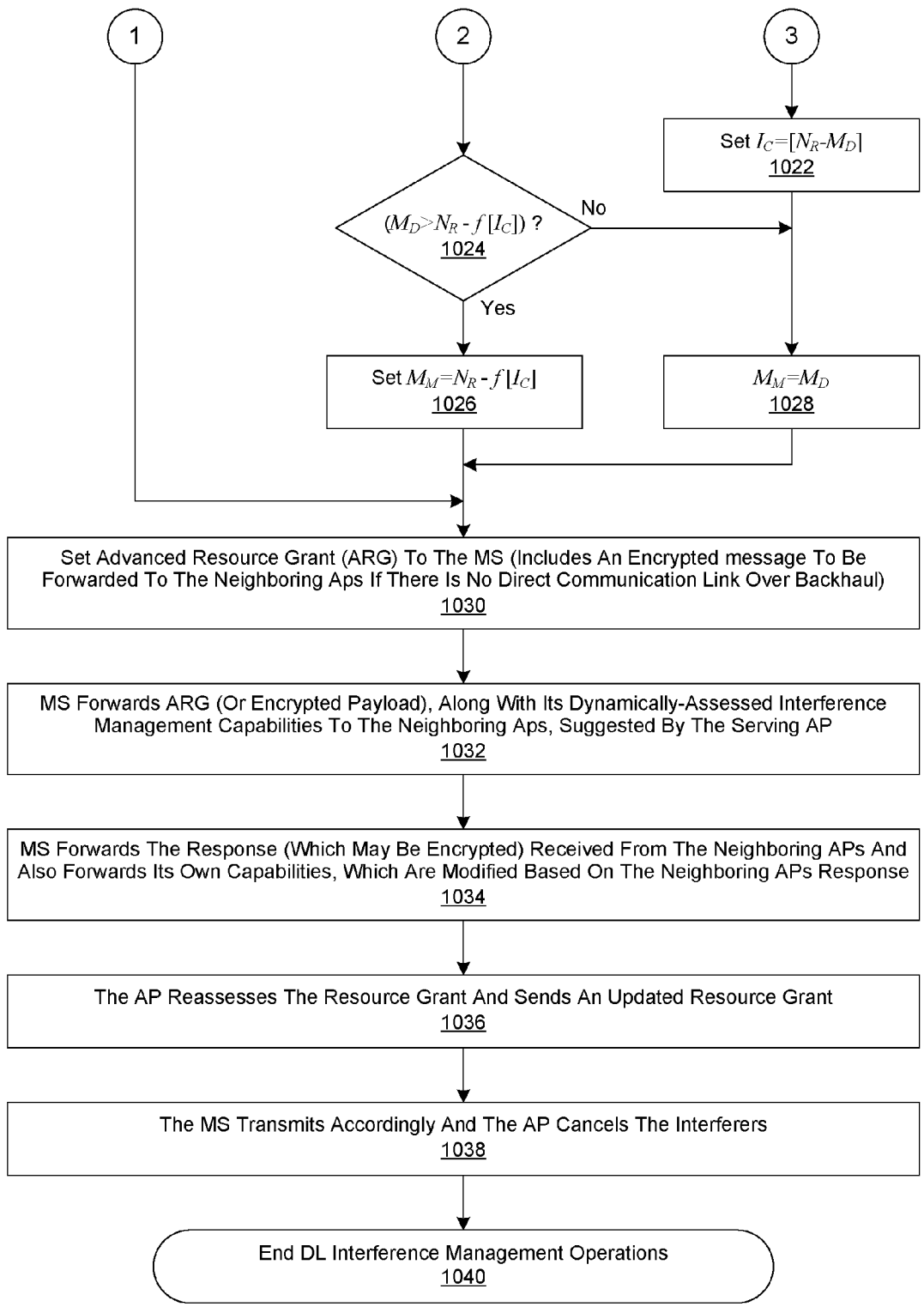

FIGS. 10a-b are a flowchart of the operations performed by an access point (AP) to manage inter-cell interference on uplink (UL) transmissions in accordance with an embodiment of the disclosure. In this embodiment, UL interference management operations are begun in step 1002, followed by a serving AP identifying dominant interfering mobile stations that are connected attached to neighboring APs in step 1004. In various embodiments, the identification is accomplished by measuring the received synchronization specific signals transmitted from all mobile stations. The serving AP can then determine those mobile stations whose transmitted signal can be treated as dominant interferer. The criteria by which the dominance is determined may depend upon the type of interference-canceling receiver used by the AP. For example, $I_D$ mobile stations attached to $N_A$ neighboring APs may be determined to be dominant. Referring to step 1006, the process described in steps 1008 through 1038 may be repeated periodically for each MS requesting UL resources. Likewise, the process described in steps 1008 through 1038 can be done for the entire radio access technology (RAT) channel or for each sub-band.

A determination is then made in step 1008 whether $I_D>0$ to determine whether the available receive antennas will be shared between the MIMO order and interference cancellation purposes. If it is determined in step 1008 that $I_D<0$, then $I_C$ is set to 0 in step 1010. Otherwise, a determination is made in step 1012 whether the number of dominant interferers ($I_D$) is greater than the maximum interference suppression capability ($I_{MAX}$) of the AP. If so, then $I_D$ is set to $I_{Max}$, in step 1014, where $I_{Max}$ indicates the number of interfering signals the AP can successfully cancel with $N_R$ receive antennas.

Thereafter, or if it is determined in step 1012 that $I_D<I_{Max}$, then a determination is made in step 816 whether $P_{IC}>PI_{MIMO}$. To do so, the AP checks the priority for interference cancellation, $P_{IC}$ and the priority for multiple-input/multiple-output (MIMO), $P_{MIMO}$. If it is determined in step 1016 that the MIMO transmission is prioritized, then $I_D$ is reduced to equal $I_C$ (i.e., $I_C=I_D$) in step 1018 such that the remaining antennas are used to suppress the interference after the requirement for MIMO is satisfied. More specifically, $I_C=f^{-1}[N_R-M_D]$, where $N_R$ represents the number of receive antennas at the AP and $M_D$ is the desired MIMO order (i.e. number independent information streams). The function $f^{-1}[x]$ represents the number of interferers that can suppressed by using x receive antennas.

However, if it is determined in step 1016 that interference cancellation is prioritized, then a determination is made in step 1020 whether $I_D \leq f^{-1}[N_R-M_D]$. More specifically, the MIMO order is calculated based on the remaining antennas after determining the number of antennas required to successfully cancel the interferers. If it is determined in step 1020 that $I_D \leq f^{-1}[N_R-M_D]$, then $I_C$ is set to equal $N_R-M_D$ in step 1022. Otherwise $I_D$ is reduced to equal $I_C$ (i.e., $I_C=I_D$) in step 1018.

A determination is then made in step 1024 whether $M_D > N_R - f[I_C]$. If not, or if $I_C$ has been set to equal $N_R - M_D$ in step 1022, then $M_M$ is set to equal $M_D$ (i.e., $M_M = M_D$) in step 1028. If not, then $M_M$ is set to equal $N_R - f[I_C]$ in step 1026.

Thereafter, or if $I_C$ has been set to equal 0 (i.e., $I_C = 0$) in step 1010, or if $M_M$ is set to equal $M_D$ (i.e., $M_M = M_D$) in step 1028, then the serving AP sends an advanced resource grant in step 1030 to the MS requesting the resources for an upcoming UL data transaction. In various embodiments, this message may include an encrypted payload to be forwarded to the neighboring APs if there is no communication link between the APs over the backhaul.

In step 1032, the MS may forward the ARG to the neighboring APs along with its own dynamically assessed interference capabilities. The set of neighboring APs to which this message is sent may be recommended by the serving AP in the advanced resource grant message. In step 1034, the MS forwards the response received from the neighboring APs to its serving AP. This message may also include an encrypted payload received from the neighboring APs. Likewise, the MS may forward its own interference mitigation capabilities, which may have changed based on the response received from the neighboring APs). In step 1036, the AP may reassess its management capabilities and send an updated resource grant. In step 1038, the MS reconfigures its transmitter and transmits according to the ARG and UL interference management operations are ended in step 1040.

Figure 11:
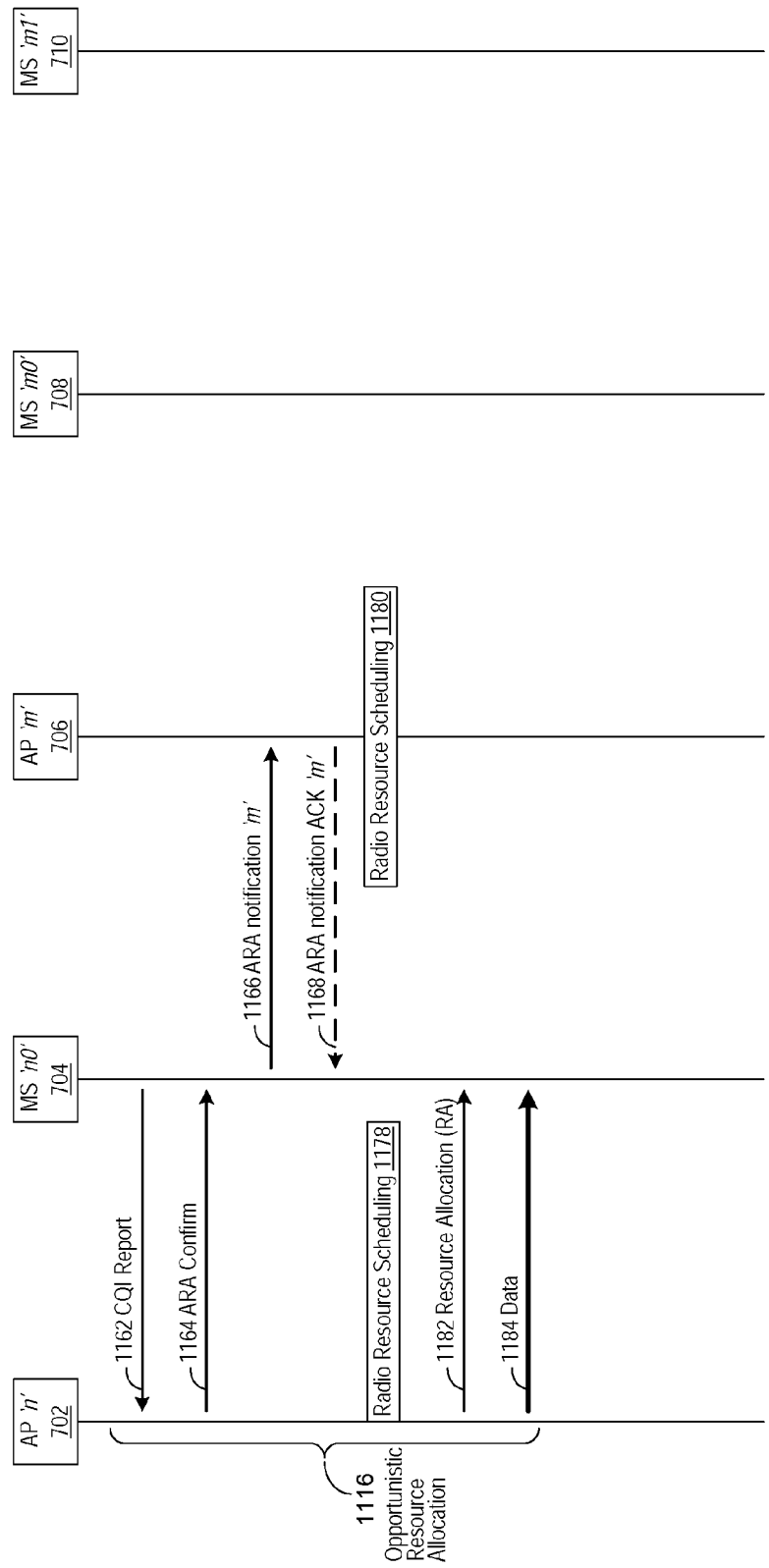
FIG. 11 shows a process signal flow for managing interference by using a MS to perform opportunistic downlink (DL) RRM operations.

FIG. 11 shows an alternative process signal flow for managing interference by using a mobile station (MS) implemented in accordance with an embodiment of the disclosure to perform downlink (DL) radio resource management (RRM) operations. In this embodiment, the performance of opportunistic interference cancellation and interference coordination on DL is initiated by first performing the steps described in the descriptive text associated with FIG. 7 for the allocation network attachment ("attachment") 712 phase. Thereafter, the steps described for the registration with non-serving nodes ("registration") 714 phase, likewise described in the descriptive text associated with FIG. 7, are performed. However, the steps for the resource allocation ("allocation") 1116 phase, as shown in FIG. 7, are modified.

Referring now to FIG. 11, if mobile station (MS) 'n0' 704 determines that it is operating in an interference mitigation mode, then in step 1162 it sends a channel quality indication (CQI) report, corresponding to the interference mitigation mode it is operating in, to its serving access point (AP) (e.g., AP 'n' 702). In response, AP 'n' 702 sends an advanced resource allocation (ARA) confirm message in step 1164 to MS 'n0' 704, assigning those resources that are suitable to its interference mitigation mode. In various embodiments, MS 'n0' 704 sends the ARA notification to cooperating APs (e.g., AP 'm' 706) in step 1166, which respectively respond with and ARA notification acknowledgement (ACK) message in step 1168. Resource scheduling is then respectively performed in step 1178 and 1180 by MS 'n0' 704 and AP 'm' 706 as described in greater detail in the descriptive text associated with FIG. 7. The serving AP (e.g., AP 'n' 702) then sends a final resource allocation message in step 1182 to MS 'n0' 704, followed by the transfer of data in step 1184.

Those of skill in the art will recognize that the process flow shown in FIG. 11 may reduce signaling overhead compared to the process flow shown in FIG. 7. However, it will be appreciated the various embodiments associated with FIG. 11 may require MS 'n0' 704 making a decision about which interference mitigation method is used. Alternatively, MS 'n0' 704 can send a CQI report for all possible interference mitigation techniques and AP 'n' 702 can assign resources suitable for one of the mitigation techniques and then inform MS 'n0' 704 of the selection it has made.

Skilled practitioners of the art will recognize that the various embodiments described in greater detail herein provide a device-assisted interference management approach to resource allocation that optimizes the spectral efficiency across a heterogeneous wireless network environment. It will likewise be appreciated that the disclosure advantageously takes into consideration the interference cancellation capability of the receiver before applying multiple-input/multiple-output (MIMO) and interference co-ordination. For example, the MIMO order is determined in accordance with the desire to cancel interference. As another example, those transmitters that can be easily canceled by the receiver's interference cancellation algorithm are not treated for interference co-ordination. Accordingly, the receiver's interference cancellation capability varies according to variable nature of its interferers. Therefore, the disclosure describes periodic or event driven signaling to convey this information to the coordinating transmitters.

Although the described exemplary embodiments disclosed herein are described with reference to device-assisted interference management in heterogeneous wireless network environments, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A mobile station (MS), comprising:
    processing logic configured to manage interference of a transmission, the processing logic configured to be used by the MS to dynamically perform capability assessment operations to generate capability data associated with interference management capabilities of the MS, wherein the capability data is configured to be provided to a serving access point (AP) and one or more neighboring APs for an assignment of radio resources according to the interference management capabilities of the MS, the serving AP, and the one or more neighboring interfering APs, wherein the processing logic is further configured to be used by the MS to make a downlink radio resource selection recommendation according to whether one or more dominant interferers can be canceled or suppressed.

2. The mobile station (MS) of claim 1, wherein residual inter-AP interference is minimized at the MS during a downlink (DL) transmission by accounting for a combination of a set of:
    the interference management capabilities of the MS;
    a capability of the serving AP to direct the transmission to the MS to mitigate the interference; and
    a capability of the one or more neighboring interfering APs to direct the transmission to a second MS to mitigate interference at the MS, the second MS respectively served by the one or more neighboring interfering APs.

3. The mobile station (MS) of claim 2, wherein the processing logic is further configured to be used by the MS to make a DL radio resource selection recommendation to the AP, the radio resource selection recommendation comprising one of:
applying DL multiple-input/multiple-output (MIMO) with all available receive antennas; and
applying DL MIMO with less than all available receive antennas.

4. The mobile station (MS) of claim 2, wherein the processing logic is further configured to be used by the MS to select a subset of radio resources from a set of recommended radio resources contained in an advanced resource allocation (ARA) message provided by the serving AP, the selecting performed according to a DL channel quality the MS observes and the selection provided by the MS to the serving AP in an ARA response message.

5. The mobile station (MS) of claim 4, wherein the processing logic is further configured to be used by the MS to communicate the ARA in an ARA notification message provided to a set of the one or more neighboring interfering APs, the MS is configured to append its preferred transmission configuration of the one or more neighboring interfering APs according to an ARA acknowledgement message received from the serving AP.

6. The mobile station (MS) of claim 5, wherein the ARA acknowledgement message comprises an encrypted payload addressed to the neighboring APs.

7. The mobile station (MS) of claim 2, wherein the processing logic is further configured to be used by the MS to configure a receiver of the MS according to a response received from the serving AP.

8. The mobile station (MS) of claim 2, wherein the processing logic is further configured to be used by the MS to configure a receiver of the MS according to a response received from the one or more neighboring interfering APs.

9. The mobile station (MS) of claim 1, wherein residual interference is minimized at a serving AP during an uplink (UL) transmission by accounting for a combination of a set of:
the interference management capabilities of the AP;
a capability of the MS to direct the transmission to its serving AP to mitigate the interference, the capability assessed dynamically by the MS; and
a capability of the one or more neighboring interfering APs to direct the transmission from a second MS to mitigate interference at the serving AP, the second MS respectively served by the one or more neighboring interfering APs.

10. The mobile station (MS) of claim 9, wherein the processing logic is further configured to be used by the MS to make a UL radio resource selection recommendation according to the dynamic interference management capabilities of the MS and feedback received from the one or more neighboring interfering APs.

11. The mobile station (MS) of claim 9, wherein the processing logic is further configured to be used by the MS to make a UL resource selection recommendation to the AP, the resource selection recommendation comprising one of:
applying UL multiple-input/multiple-output (MIMO) with all available transmit antennas; and
applying UL MIMO with less than all available transmit antennas.

12. The mobile station (MS) of claim 9, wherein the processing logic is further configured to be used by the MS for sending an advance radio resource grant (ARG) notification message to the one or more neighboring interfering APs, wherein an identity of the one or more neighboring interfering APs is identified by the MS in the ARG notification message.

13. The mobile station (MS) of claim 12, wherein the ARG notification message comprises capability data associated with the MS's interference management capabilities for each resource, wherein the capability data is included in the ARG notification message subsequent to the MS dynamically assessing its interference avoidance and transmission capabilities.

14. The mobile station (MS) of claim 13, wherein the processing logic is further configured to be used by the MS for forwarding an ARG response acknowledgement (ACK) message from the one or more neighboring interfering APs to the serving AP.

15. The mobile station (MS) of claim 14, wherein the processing logic is further configured to be used by the MS for adjusting its transmission to match with an ARG notification ACK message from the serving AP or when a predetermined time interval expires.

16. The mobile station (MS) of claim 1, wherein the processing logic is further configured to be used by the MS for establishing a secure tunnel between the serving AP and the one or more neighboring interfering APs, the secure tunnel established via the MS.

17. The mobile station (MS) of claim 16, wherein the secure tunnel is configured to be used by the serving AP to send authentication keys to the MS and the one or more neighboring interfering APs, the authentication keys used for subsequent attachment or authentication operations.

18. A method for managing interference of a transmission, comprising:
using processing logic of a mobile station (MS) to dynamically perform capability assessment operations to generate capability data associated with interference management capabilities of the MS; and
providing the capability data to a serving access point (AP) and one or more neighboring APs for an assignment of radio resources according to the interference management capabilities of the MS, the serving AP, and the one or more neighboring interfering APs,
wherein the processing logic is further configured to be used by the MS to make a downlink radio resource selection recommendation according to whether one or more dominant interferers can be canceled or suppressed.

19. The method of claim 18, wherein residual inter-AP interference is minimized at the MS during a downlink (DL) transmission by accounting for a combination of a set of:
the interference management capabilities of the MS;
a capability of the serving AP to direct the transmission to the MS to mitigate the interference; and
a capability of the one or more neighboring interfering APs to direct the transmission to a second MS to mitigate interference at the MS, the second MS respectively served by the one or more neighboring interfering APs.

* * * * *